Patented July 28, 1942

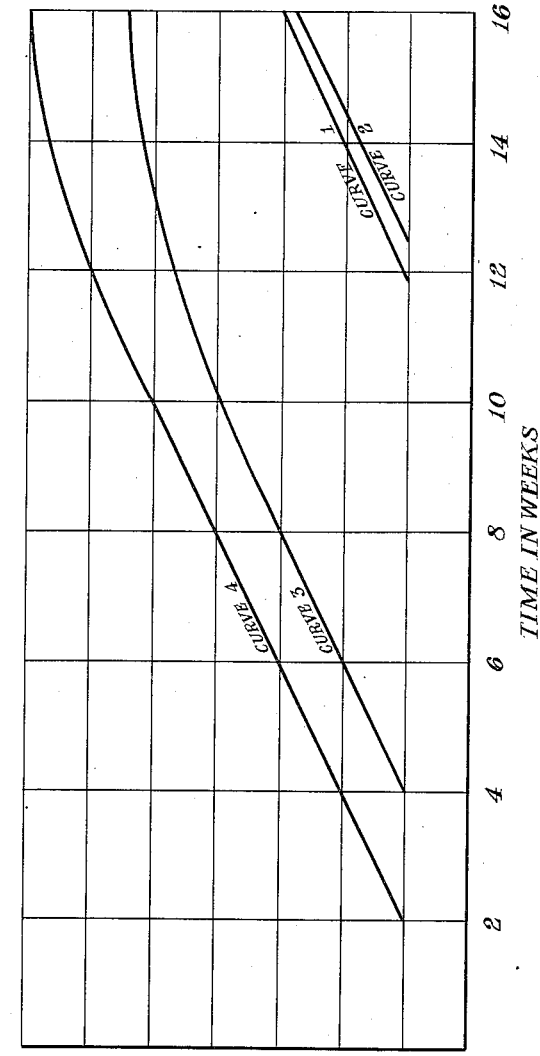

2,291,091

UNITED STATES PATENT OFFICE 2,291,091

SURFACE COATING COMPOSITION

Durant W. Robertson, Rutherford, N. J., assignor to National Lead Company, New York, N. Y., a corporation of New Jersey Application October 29, 1938, Serial No. 237,594

6 Claims. (Cl. 260—38)

This invention relates to white lead (basic lead carbonate) compositions of paste consistency from which by thinning with oleaginous vehicles surface coating compositions are prepared.

Primary among the objects of the present invention is the preparation of white lead pastes from which by addition of an oleaginous vehicle surface coating compositions can be prepared having increased hiding power, improved resistance and a reduced tendency to "checking" as compared with prior art white lead paints. This and other objects of the invention will become apparent from the following description thereof.

White lead, i. e., pigmentary basic lead carbonate, has been employed as a pigment for so long that exact knowledge of its first use is shrouded in uncertainty. Its use has, however, persisted through the years so that, even at the present day, it is the standard paint pigment with many painters. Its popularity is justly deserved because it possesses many desirable features, among which may be mentioned: (1) It may be mixed with a small amount of oleaginous film-forming vehicle to form a paste which when sold to the consumer may be converted to a paint, ready for use, by the simple expedient of adding sufficient additional vehicle to reduce the paste to the consistency of paint. (2) Due to its basic, i. e., alkaline nature, the white lead reacts slowly with the drying oil films forming lead soaps which act as plasticizers keeping the films soft and pliable and hence prolong the life of the paint. (3) It is not only adapted for the outer, or top, coat but also for the under, or priming coat. However, paints containing white lead possess certain disadvantages: (1) As compared to such pigments as titanium dioxide, white lead has a very low hiding power value being in the order of about one-tenth that of the titanium dioxide. (2) Although possessing less tendency to chalk than, for example, titanium dioxide, white lead does, nevertheless, chalk to such an extent—and at an accelerated rate as the paint films containing it age—that after exposure for some time, which will be shorter or longer depending upon the weathering conditions, all of the film gradually erodes away. (3) White lead paint films on aging develop fine fissures in the film in a characteristic manner forming small islands of adhering paint. This phenomenon is termed "checking." By means of the present invention these disadvantages of white lead are largely eliminated; that is to say, the hiding power is increased, the tendency to "chalking" is reduced and "checking" is largely eliminated.

Briefly described and in its broadest aspect the present invention is based upon the discovery that when a white lead paint is prepared by adding an oleaginous vehicle to a white lead paste in which the white lead is associated with titanium dioxide and a relatively small amount of a drying oil-soluble resin there results a surface coating composition which will exhibit greater hiding power and a reduced tendency to "chalk" and to "check" as compared with a straight white lead paint. The improved results of the invention accrue when these three ingredients (white lead, titanium dioxide and drying oil-soluble resin) are compounded into a paste by admixture with drying oil vehicle and these improved results are not affected by the presence of other surface coating ingredients such as extender pigments, e. g., barytes, calcium sulfate, silica, etc. In fact, the invention embraces all white lead pastes which contain white lead, titanium dioxide and drying oil-soluble resin in proportions relative to each other subsequently to be established.

Previous endeavors to increase the hiding power of white lead paints through the introduction of titanium dioxide have met with failure because there resulted from such addition a marked increase in chalking. On the other hand, the addition of a drying oil-soluble resin to white lead paints in amounts sufficient appreciably to reduce the normal chalking of a white lead paint causes such an increase in checking that such additions have not proved practical for paint purposes. It is, therefore, surprising that according to the present invention paint compositions can be prepared which contain titanium dioxide, and hence have an increased hiding power, but yet exhibit a reduced tendency to chalking and which also contain a drying oil-soluble resin but nevertheless show a reduction in the tendency toward checking. Accordingly, it is evident that the components of the products of the invention, particularly the white lead, the titanium dioxide, the drying oil and the resin, coact one upon the other to produce the improved results of the invention.

Thus, the invention is directed primarily to the novel white lead paste compositions.

The various features of the invention will now be described in detail:

I. PIGMENTS AVAILABLE IN THE PRACTICE OF THE INVENTION

The invention is not restricted to the use of any particular type of white lead or titanium dioxide. Pigmentary white lead whether produced by the well-known Dutch process, Carter process, electrolytic precipitation processes or otherwise, are equally suitable. Titanium dioxide produced by any process may also be used, nor is the crystalline structure, anatase or rutile, a factor.

II. RESINS AVAILABLE IN THE PRACTICE OF THE INVENTION

The resins useful in the practice of the invention include all drying oil-soluble resins which do not precipitate out of solution during the film-forming drying process. Because synthetic drying oil-soluble resins have uniform quality, composition and physical properties, these are to be preferred. The following classes of synthetic resins have been investigated and found suitable for use in the present invention:

(a) The so-called "100% phenol-aldehyde resins"

This class comprises condensation products of aldehydes, principally formaldehyde, and substituted phenolic bodies, principally para-substituted phenols such as paraphenylphenol, $C_6H_5.C_6H_4OH$, and para-tertiary-amyl-phenol, $C_5H_{11}.C_6H_4.OH$.

(b) The so-called "modified phenolic resins"

This class comprises the condensation products of aldehydes, principally formaldehyde, with simple phenolic bodies such as phenol, $C_6H_5OH$, and the homologous cresol, $CH_3.C_6H_4.OH$, and organic materials consisting essentially of a high molecular weight organic acid, such as colophony, drying oil fatty acids and the like which impart oil-solubility to the otherwise insoluble condensation products of aldehydes and simple phenolic bodies.

(c) The so-called "alkyd resins"

This class comprises the condensation products of polyhydric alcohols such as glycol, glycerine, etc., with polybasic organic acids, such as phthalic anhydride, polybasic acids of terpene origin, maleic acid or anhydride, and the like, and an organic material consisting essentially of a high molecular weight acid, such as colophony, drying oil fatty acids, and the like, which impart oil-solubility to the otherwise insoluble condensation products of polyhydric alcohols and polybasic acids.

(d) The so-called "modified natural resins"

This class comprises the products obtained by esterifying natural resins which consist essentially of high molecular weight organic acids, for example, copal resin, rosin (colophony) and the like with a polyhydric alcohol such as glycol, glycerine, etc. The resin known as "ester-gum" is an outstanding example of this type of resin which may be used in the practice of the invention.

(e) The so-called "cumarone-indene resins"

This class comprises those resins which are obtained by subjecting solvent naphtha to the action of polymerizing agents, such as sulfuric acid. This polymerization treatment causes the cumarone, indene, styrol and cyclopentadiene constituents of the solvent naphtha to polymerize forming a precipitate of thick, viscous material which when fractionally distilled under reduced pressure yields resinous bodies of varying degrees of hardness and melting points.

Although it has been found that synthetic resins embraced by the above described classes are useful in the practice of the invention, those of the "modified phenolic" type and the "cumarone-indene" type give the best results. The "cumarone-indene" resins are to be somewhat preferred because they are more readily soluble in the oils and thinners commonly used in paints.

Furthermore, as aforesaid, though the synthetic resins are to be preferred over the natural resins these latter are included in the scope of the invention. They may be used if desired but being natural products different batches of the same resin will often vary in quality and chemical composition to such an extent that they are not nearly as well adapted for use in the standardized paint formulation of modern industry as are the synthetic resins.

III. PREPARATION OF THE WHITE LEAD-TITANIUM DIOXIDE-RESIN-DRYING OIL PASTE

Any method known to paint grinders which will produce a pigment-vehicle composition may be employed in the practice of the present invention. To some extent the type of resin and condition of the white lead, i. e., whether it is in the form of a dry powder or as an aqueous slurry, will determine the proper method to employ. The following descriptions of four suitable methods will indicate to those skilled in this art how the best method of preparing surface coating compositions in paste form may be determined:

(a) "The cold-cutting method"

If the resin selected be sufficiently soluble at moderate temperatures in the usual paint thinners such as turpentine, mineral spirits, solvent naphtha, etc., the desired quantity may be dissolved in a suitable amount of thinner and the resultant solution admixed with the proper amount of drying oil. The white lead and titanium dioxide are then ground with the resin-thinner-drying oil solution in any usual paint grinders mill, e. g., a roller mill, an edge-runner mill, etc., to form a paste of the desired consistencies or it may be "pulped" in the usual way from pigment-water slurries.

(b) "The short-oil varnish method"

If the resin is not sufficiently soluble in either the usual paint thinners or drying oils it is best cooked into the drying oil, which in this instance may be any suitable drying oil or combination of drying oils, to form a short oil varnish of from about 5 gallon to 20 gallon oil length. By "oil length" is meant the number of gallons used to dissolve 100 pounds of resin. Thus, a 5 gallon oil length indicates that 5 gallons of oil have been employed to dissolve 100 pounds of resin. If the resultant varnish is too viscous to permit grinding with the pigments, thinner may be added and the white lead and titanium dioxide incorporated therewith, preferably by grinding.

(c) "The long oil varnish method"

The technique of this method is similar to that of the "short oil varnish method," except that larger quantities of oil are employed, usually to produce varnishes of from about 60 gallon oil length to 70 gallon oil length. It is not generally to be recommended because too much varnish is required to bring the desired quantity of resin to the paste.

(d) "The oil-blending method"

This is the preferred method where solubility of the resin in oil permits its use. In this method the resin is simply dissolved in the drying oil, which is preferably linseed oil, or if desired, a mixture of drying oil and thinner and the pigments incorporated therewith. This method like method (a) lends itself to preparing pastes where the white lead is in the form of an aqueous slurry. Where this is the case the titanium dioxide may simply be mixed with the white lead slurry and the resin-oil vehicle then added thereto. Because the pigments possess greater affinity for oil than for water the vehicle is adsorbed by the pigments, the pigment-oil pulp settles to the bottom of the receptacle in which the operation is being carried out while the water rises to the top. The water and oil-pigment pulp then are separated in any suitable manner.

To those skilled in this art the properties of the drying oil soluble resins are sufficiently well-known to render superfluous here any detailed discussion as to which of the above described methods should be employed with the various types of resins. It may be pointed out, however, that the "cumarone-indene" resins are adaptable with all four methods; these resins, therefore, at once suggest themselves for use with the simplest of the above described methods, i. e., method (d). The "modified phenolic" type resins largely require method (b) or method (c), while the "alkyd" and "100% phenolic" resin may, in most cases be used with methods (a) as well as methods (b) and (c).

IV. THE PROPORTIONS OF INGREDIENTS OF THE PASTE AND PROPERTIES THEREOF

The titanium dioxide should preferably be present in an amount less than the white lead because, as will be appreciated, if the titanium dioxide exceeds the white lead by an appreciable amount the ultimately prepared paint will largely lose its characteristics of a true white lead paint. The improved results of the invention accrue when using only a small amount of titanium dioxide for example, about one percent of the combined weight of both pigments. The preferred content of titanium dioxide will, for practical purposes be about 1 percent to about 10 percent of the combined weight of titanium dioxide and white lead, 5 per cent titanium dioxide being an excellent proportion.

The proportion of drying oil-soluble resin can most conveniently be based upon the amount of drying oil in the paint composition of the present invention. The improved results of the present invention are evidenced when the resin is present in amounts upwards of about 5 percent, based upon the weight of drying oil in the vehicle. Beyond about 50 percent resin, based upon the weight of the drying oil, no added improvement is to be observed and, furthermore, the compositions become too thick and viscous for practical working. In most cases the proportion of resin will be found within the range of about 15 percent to about 40 percent, based upon the weight of drying oil in the vehicle. The optimum proportion of resin has been found to be about 1 part resin to 3 parts drying oil, which, on a percentage basis, is about 25 percent.

It is one feature of the invention that the titanated white lead pastes prepared in accordance therewith are of such consistency that they may be made up into paint without any deviation from the standard practice. This is of great practical importance because any paste compositions which require that the painter depart from his customary procedure cannot readily find a market. The improved results are obtained without necessitating any special handling by the painter. Thus, the preferred composition of titanated white lead pastes of the invention will consist substantially of 89 percent pigment (white lead and titanium dioxide) and substantially 11 percent vehicle (drying oil, preferably pure linseed oil, thinner, preferably turpentine, and resin) which proportions of pigment and vehicle prevail in the standard so-called "soft paste" white lead. It will be understood that other proportions of pigment mixture to vehicle may be employed to obtain stiffer or softer pastes without departing from the scope of the invention, but for practical purposes the proportions of 89 percent pigment mixture and 11 percent vehicle are to be preferred because they are standard throughout the paint trade.

When the paste compositions of the present invention are reduced to paint consistency by dilution with additional quantities of drying oil, the amount of the resin is, of course, reduced so that in the ultimate paint the resin will be found to be between about 1.5 percent to about 15 percent of the vehicle, an optimum amount being between about 6.5 percent and 7.5 percent. The consistency of the paste paint compositions of the present invention may be varied by controlling the amount of thinner in the vehicle mixture and the amount of vehicle with which the pigment mixture is incorporated. Throughout the paint industry the expression "soft paste white lead" and "heavy paste white lead" have a definite connotation as to consistency. Thus, the consistency of the soft paste white lead is that consistency which is obtained by mixing together basic carbonate white lead pigment and a vehicle consisting of linseed oil and turpentine in such amounts that the paste will consist of approximately 89 percent pigment, 9 percent linseed oil and 2 percent turpentine. The "heavy paste white lead" has a consistency which is that consistency obtained by mixing basic carbonate white lead pigment with linseed oil in proportions of about 91 percent white lead and 9 percent linseed oil. It will thus be seen that the amount of thinner which preferably may be employed in the practice of the present invention will be sufficient to reduce the consistency of the resin-drying oil mixture so that when mixed with the titanium dioxide-white lead pigment mixture in the proportion of 89 percent pigment mixture and 11 percent vehicle mixture it will produce a consistency substantially that of the standard soft paste white lead of commerce, or when mixed with the titanium dioxide-white lead pigment mixture, in the proportion of 91 percent pigment to 9 percent vehicle, it will produce a consistency substantially that of the consistency of the standard heavy paste white lead of commerce. According to the invention, commercially practical paste may be prepared containing as little as 9 percent vehicle mixture. Below that amount the paste is too stiff for practical working. An upper limit to the proportion of vehicle pigment mixture need not be established, because it will be appreciated that there is always added more vehicle when reducing the paste to paint consistency. Consequently, more vehicle than about 11 percent may be added to the pigment mixture without departing from the scope of the invention. The resulting paste would then be thinner than the usual paste of commerce but it is not desirable to add more vehicle than about 13 percent when it is desired to prepare a paste from which a paint will be made by simple dilution with drying oil.

The titanated white lead pastes of the present invention find use in any paint formulas which call for a white lead paste of similar composition. Such formulas are published in a complete form in "The Handbook of Painting," published and copyrighted by the National Lead Company, year 1936.

V. IMPROVED RESULTS OF THE PRESENT INVENTION

The following examples of the practice of the invention illustrate but do not limit the invention and enable those skilled in the art to draw a comparison with prior art products.

Example I

Pigment composition: 89%
    95% Carter process white lead
    5% titanium dioxide
Vehicle 11%
    81.7% special vehicle
        75% linseed oil
        25% cumarone-indene resin known in the trade as Cumar V½
    18.3% turpentine The white lead and titanium dioxide were thoroughly mixed in a mechanical mixer. The cumarone-indene resin was dissolved separately in the linseed oil to make up the special vehicle. The turpentine was then added to the vehicle and then the pigment mixture ground into the vehicle on the usual type of paint mixing rolls. The resulting paste was designated Paste No. 1.

Example II

Pigment 89%
    95% Carter process white lead
    5% titanium dioxide
Vehicle 11%
    48.6% special vehicle
        Varnish: 5 gallon length China-wood oil and modified phenolic resin. Non-volatile=56.7%.
    51.4% linseed oil.

The white lead and titanium dioxide was mixed as in Example No. 1. The special vehicle was prepared by cooking 100 pounds of the modified phenolic resin (known in the trade as Amberol 226) into 5 gallons of China-wood oil and adding thereto a small amount of lead salt as drier. The thinner was added after the resin had been dissolved in the oil and during the cooling. Standard varnish making technique was employed in preparing the special vehicle. The linseed oil was added to the varnish and the pigment mixture ground into the vehicle as under Example No. 1. The resulting paste was designated Paste No. 2. In order to furnish some basis for comparison, Pastes No. 1 and No. 2 were made up into paints and the paints obtained thereby compared with a straight white lead paint and a paint made from a white lead paste to which had been added 5% titanium dioxide, based on the combined weight of the pigment. Three types of paint were prepared: a so-called "priming" paint to be applied directly to new wood; a "second-coat" paint to be applied over the priming coat and a final or "finishing" coat. The formulas for all three paints were the following:

1. For the priming coat paint:
    Paste _____ lbs__ 100
    Linseed oil _____ gals__ 4
    Turpentine _____ do____ 1¾
    Liquid drier _____ pint__ 1

2. For the second coat paint:
    Paste _____ lbs__ 100
    Linseed oil _____ gals__ 1½
    Turpentine _____ do____ 1½
    Liquid drier _____ pint__ 1

3. For the finishing coat paint:
    Paste _____ lbs__ 100
    Linseed oil _____ gals__ 3
    Turpentine _____ —
    Liquid drier _____ pint__ 1

It will be understood of course, that in each of the formulas the paste employed was either paste No. 1 or paste No. 2; the straight-white lead so-called "soft" paste or the white lead paste containing titanium dioxide thus making for each type of paint 4 different paints or a total of 12. Wooden panels were painted with these paints, first applying the priming coat and after a sufficient time for this coat to penetrate the open pores of the wood and to dry, next applying the second coat and finally the third coat. Thereafter, these panels were exposed in Florida at a 45° angle facing south, for a test period of 16 weeks. The results obtained are given on the chart designated Fig. 1.

On Fig. 1 the results of a 16 week exposure under the conditions of Florida weather are plotted graphically. The ordinates are the degree of chalking as observed by a trained technologist. The abscissae are time of exposure expressed in weeks. It is at once evident from Fig. 1 that the addition of even 5 percent titanium dioxide to a straight white lead paste correspondingly increases the rate of chalking whereas the products of the present invention show materially reduced rates of chalking, and a long delayed period before any chalking is evident. The tendency to "check" is correspondingly retarded in the products of the present invention as compared with straight white lead paints, or straight white lead paints containing some synthetic resin vehicle.

This description has been given for clearness of understanding and no undue limitation should be deduced therefrom but the appended claims should be interpreted as broadly as possible in view of the prior art.

I claim:
1. As a new composition of matter, a paint composition of paste consistency consisting of a pigment portion of about 89 percent and a vehicle portion of about 11 percent; the pigment portion consisting of a mixture of titanium dioxide pigment and basic carbonate white lead pigment, the titanium dioxide being between about 1.0 percent and about 10 percent by weight of the said pigment mixture, and the basic carbonate white lead pigment constituting the balance; the vehicle portion consisting of drying oil, a drying oil-soluble synthetic resin and thinner, the amount of said resin being between about 15 percent and about 40 percent based on the combined weight of drying oil and resin in the said vehicle portion and the amount of thinner being sufficient so to reduce the viscosity of the said vehicle portion that when the vehicle portion is mixed with the pigment portion the resulting paste will have a consistency substantially the same as the consistency of the standard "soft paste white lead."

2. As a new composition of matter, a paint composition of paste consistency, consisting of a pigment portion of about 89 percent and vehicle portion of about 11 percent; the pigment portion consisting of a mixture of about 5 percent titanium dioxide pigment and about 95 percent basic carbonate white lead pigment; the vehicle portion consisting of about 60-61 percent drying oil, 20-21 percent drying oil-soluble synthetic resin, and about 18-19 percent thinner.

3. As a new composition of matter, a product as described in claim 1, in which the drying oil-soluble, synthetic resin is an alkyd resin.

4. As a new composition of matter, a product as described in claim 1, in which the drying oil-soluble, synthetic resin is a cumarone-indene resin.

5. As a new composition of matter, a product as described in claim 1, in which the drying oil-soluble, synthetic resin is a modified phenolic resin.

6. As a new composition of matter, a product as described in claim 2, in which the drying oil-soluble, synthetic resin is a cumarone-indene resin.

DURANT W. ROBERTSON.